United States Patent [19]

Jones et al.

[11] 4,393,338

[45] Jul. 12, 1983

[54] VEHICLE PROPULSION MOTOR CONTROL APPARATUS

[75] Inventors: Stanley W. Jones, McMurray; James H. Franz, Jr., Murrysville, both of Pa.

[73] Assignee: Westinghouse Electric Corp., Pittsburgh, Pa.

[21] Appl. No.: 258,852

[22] Filed: Apr. 29, 1981

[51] Int. Cl.³ .............................................. H02P 3/00
[52] U.S. Cl. ........................................ 318/86; 318/95; 318/50
[58] Field of Search .................. 318/49, 50, 56, 57, 318/60, 79, 63, 86, 112, 113, 345 C, 345 G, 248, 95, 269, 434, 376, 393, 87, 88, 89

[56] References Cited

U.S. PATENT DOCUMENTS

| | | | |
|---|---|---|---|
| 2,186,227 | 1/1940 | Austin | 318/63 |
| 2,265,706 | 12/1941 | Tritle | 318/274 |
| 2,295,285 | 9/1942 | McNairy et al. | 318/57 |
| 2,400,998 | 5/1946 | Krapf | 318/63 |
| 2,515,982 | 7/1950 | Brane | 318/89 X |
| 2,523,142 | 9/1950 | Riley | 318/89 X |
| 2,605,454 | 7/1952 | Grepe | 318/380 |
| 3,324,373 | 6/1967 | Stamm | 318/274 |
| 3,504,256 | 3/1970 | Metcalfe | 318/246 |
| 3,535,305 | 10/1970 | Carter et al. | 260/123 |
| 3,543,121 | 11/1970 | Miller | 318/393 |
| 3,559,009 | 1/1971 | Mills | 318/95 |
| 3,601,670 | 8/1971 | Eriksson et al. | 318/87 |
| 3,769,566 | 10/1973 | Mehta | 318/375 |
| 3,803,454 | 4/1974 | Higuchi | 307/240 |
| 3,896,350 | 7/1975 | Kipp | 318/87 |
| 4,095,153 | 6/1978 | Matty et al. | 318/376 |

OTHER PUBLICATIONS

B. J. Krings, "Alternative Systems for Rapid-Transit Propulsion and Electrical Braking," Westinghouse Engineer, Mar. 1973, pp. 34–41.

*Primary Examiner*—Ulysses Weldon
*Attorney, Agent, or Firm*—R. G. Brodahl

[57] ABSTRACT

A solid-state direct current motor control apparatus including a programmed microprocessor operative with a plurality of series motors to determine the selection of a power mode of operation, a brake mode of operation and a coast mode of operation, with a desired energization of particular motor fields before the brake mode of operation.

5 Claims, 6 Drawing Figures

VEHICLE PROPULSION MOTOR CONTROL APPARATUS

The present application is related to a patent application Ser. No. 086,380 filed Oct. 19, 1979, now issued as U.S. Pat. No. 4,284,930, and entitled "Motor Controlled Apparatus and Method" by T. C. Matty, a patent application Ser. No. 902,001 filed Apr. 27, 1978, now issued as U.S. Pat. No. 4,282,466 and entitled "Transit Vehicle Motor Effort Control Apparatus and Method" by T. C. Matty and a concurrently-filed patent application Ser. No. 258,509 by S. W. Jones and J. W. Franz and entitled, "Propulsion Motor Control Apparatus", that are assigned to the same assignee and the disclosures of which are incorporated herein by reference.

BACKGROUND OF THE INVENTION

It is known in the prior art to control the speed of a vehicle propulsion direct current series motor by a chopper apparatus including a thyristor switch device in series with the motor. Speed control of the motor is provided by varying the width of the voltage pulses supplied to the motor such that the resulting average power supplied to the motor establishes the operational speed thereof. A commutation circuit including a charge capacitor has been used to provide a biased voltage across a conducting thyristor device for commutating the conduction of that thyristor device. A traction motor is operative in a motoring mode when the passenger vehicle is being propelled or accelerated along a track and in a brake mode when the vehicle is being stopped or decelerated.

It is known in the prior art to control the operation of one or more transit vehicle motors with a chopper apparatus as described in U.S. Pat. Nos. 3,559,009, of J. M. Mills, 3,543,121 of L. G. Miller and 3,535,503 of H. C. Appelo et al.

As described in a published Article in the Westinghouse Engineer for March 1973 at pp. 34–41 the average voltage supplied to the motor armature is controlled by adjusting the ratio of chopper OFF-time to the chopper ON-time with the resulting average motor armature current determining the motor torque for moving the vehicle along a track. In the motoring or power mode of operation the motors of a vehicle are connected by mechanical switches in relation to a direct current voltage source such that current is supplied through a chopper when the chopper is ON and through the motors to ground. When the chopper is turned OFF, the energy stored in the motor reactor and the inductance of the motor field maintains current flow in the motor circuit through a free-wheeling diode. In the brake or deceleration mode of operation, the motors in the prior art were reconnected by mechanical changeover switches with the motors operative as self-excited generators to provide dynamic or regenerative braking of the vehicle. With the chopper ON, the motor current increases and with the chopper OFF, the current is forced into the power supply through the free-wheeling diode by the motor reactor.

It is known in the prior art as shown by U.S. Pat. No. 4,095,153 of T. C. Matty et al. to utilize a microprocessor chopper control of regenerative brake current buildup by providing an upper current limit to control chopper-ON operation and a lower current limit to control chopper-OFF operation.

SUMMARY OF THE INVENTION

In a motor control apparatus including a plurality of DC series motors, a bridge circuit arrangement of those motors is provided with current sensing devices operative with selective motor armatures and motor fields, and with the motor fields connected to improve the desired current balancing in both the motor mode and the brake mode of operation. A power thyristor switch and a power diode are connected to control the power mode of operation and a brake thyristor and a brake diode are connected to control the brake mode of operation.

DESCRIPTION OF A PREFERRED EMBODIMENT

Figure 1:
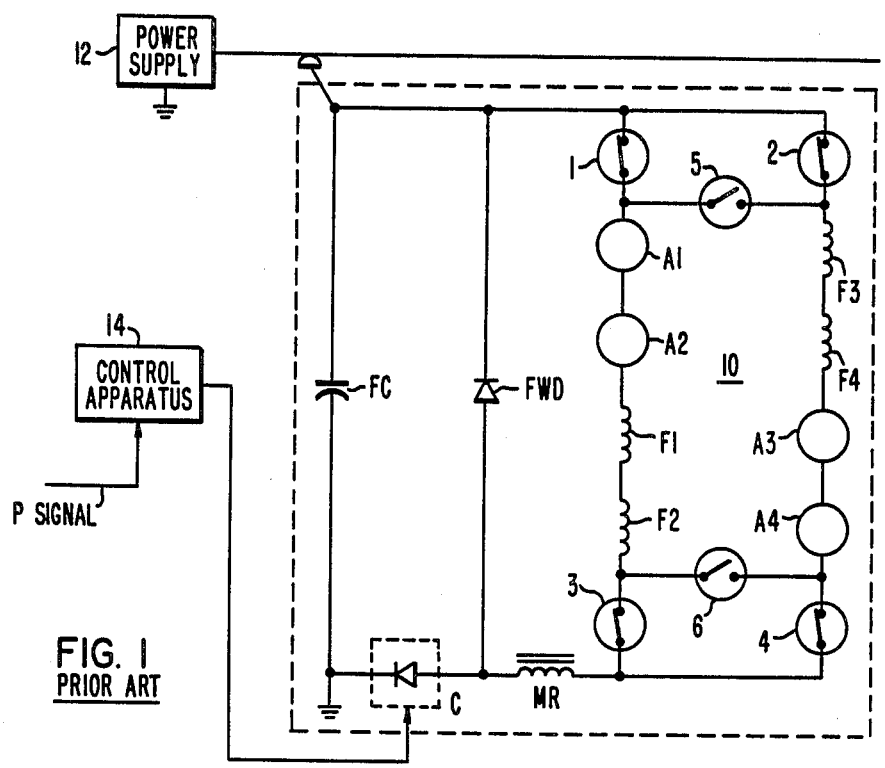
FIG. 1 shows a prior art motor control apparatus for a plurality of vehicle propulsion motors in the power mode.

FIG. 1 shows a prior art motor control apparatus for a plurality of vehicle propulsion motors operative in the power mode. The motors are DC series motors each including an armature and a field winding, with the first and second motor armatures A1 and A2 being connected in series with the first and second motor field windings F1 and F2, while the third and fourth motor armatures A3 and A4 are connected in series with the third and fourth motor field windings F3 and F4, such that these four motors are connected in a motor circuit 10 with two in series and the two groups of two motors connected in parallel, as determined by closing the mechanical switches 1, 2, 3 and 4 and by opening the mechanical switches 5 and 6. In the power mode a chopper C is used to regulate the current in the motor circuit 10, turning the chopper C ON builds up currents in the motors by completing the circuit from the DC power supply 12 through the motors in the motor circuit 10 to ground. When the chopper C is turned OFF, the energy stored in the motor reactor MR and the inductance of the motors in the motor circuit 10 maintains current flow through the freewheeling diode FWD. The operation of the copper C in this regard is described in greater detail in the above-referenced published Article in the Westinghouse Engineer for March 1973.

The average voltage applied to the motors is controlled by adjusting the ratio of the OFF-time to the ON-time of the chopper C. This adjustment is made by the control apparatus 14 in response to the effort request P signal for selecting the power mode and maintaining the desired average motor current and, therefore, the average motor torque. When operating with full voltage applied to the motors, the chopper C switches at the normal frequency of approximately 218 Hz with an OFF-interval of about 6% of the total cycle time.

Figure 2:
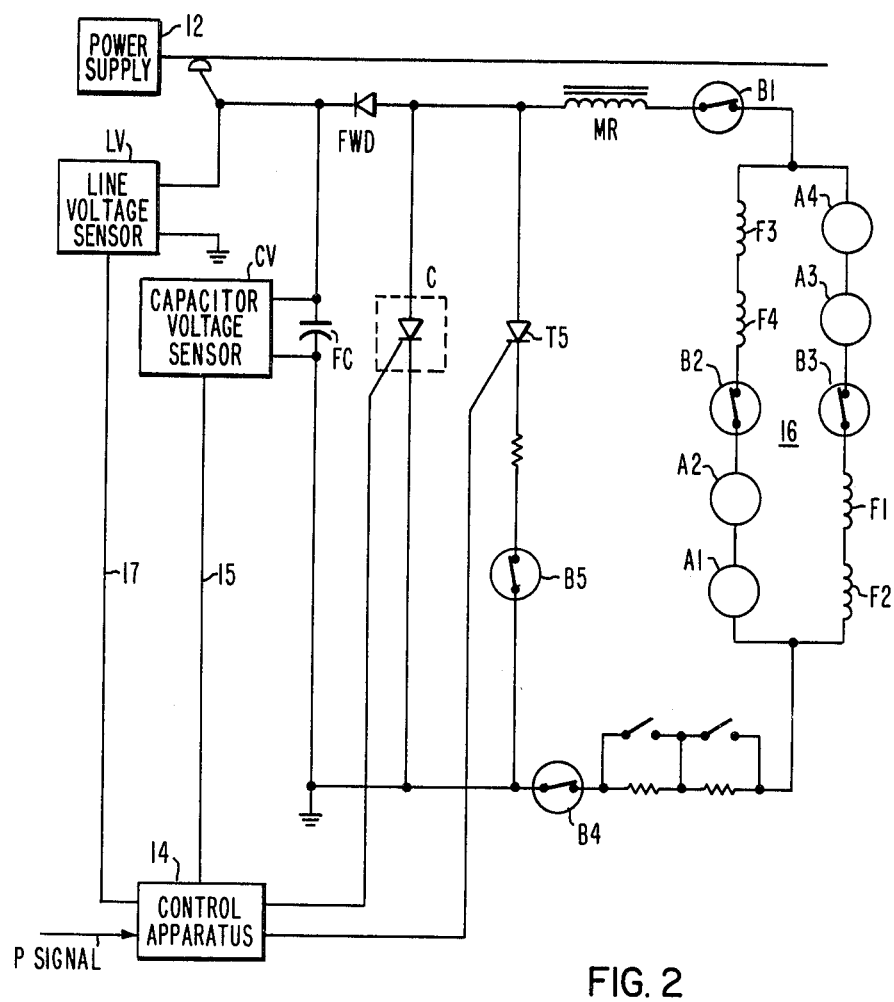
FIG. 2 shows a prior art motor control apparatus for a plurality of vehicle propulsion motors in the brake mode.

FIG. 2 shows a prior art motor control apparatus for a plurality of vehicle propulsion motors operative in the brake mode. For the brake mode of operation the motors are changed to the arrangement as shown in the motor circuit 16 of FIG. 2 by means of well-known power brake changeover mechanical switches B1, B2, B3, B4 and B5 in accordance with the above-referenced Article in the Westinghouse Engineer for March 1973. The circuit shown in FIG. 2 is arranged for regenerative or dynamic braking with the motors operative as self-excited generators. The fields are connected to force load division between the paralleled generators. In regenerative braking the function of the chopper is the same as is its function in the power mode with the ON/OFF ratio being regulated to maintain the desired current with the greater motor current providing the greater braking to the vehicle. With the chopper C turned ON, the current in the motor circuit 16 increases. When the chopper C is turned OFF, the current flowing in the chopper is forced back to the power supply 12 through the freewheeling diode FWD by the motor reactor MR. The control apparatus 14 for logically controlling the operation of the chopper C in response to the P signal for selecting the brake mode and monitors the voltage 15 across the line filter capacitor FC and the line voltage 17 to control the chopper ON/OFF ratio in such a manner as to prevent the capacitor voltage from exceeding the line voltage.

Figure 3:
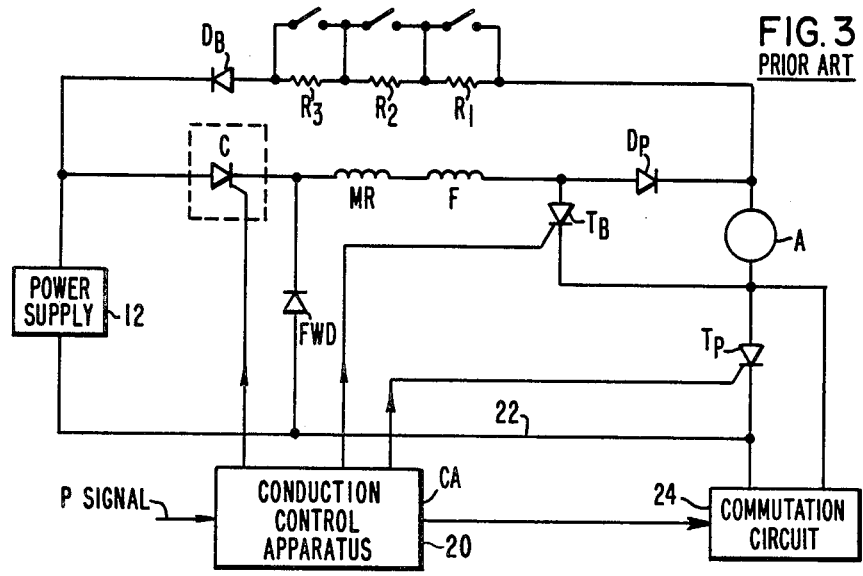
FIG. 3 shows a prior art motor control apparatus using solid-state switching devices to determine for a single propulsion motor one of a power mode and a brake mode of operation.

In FIG. 3 there is shown a prior art motor control apparatus utilizing solid-state switching devices to determine for a single propulsion motor one of a power mode and a brake mode of operation. The main chopper thyristor switch C is gated by a well known conduction control apparatus 20 in response to the P signal effort request to close and become conductive and then is subsequently commutated to open and become not conductive as required to provide a desired average voltage across the motor armature A which determines the motor speed. Each time the main chopper C is turned ON the voltage across the motor armature A and the motor reactor MR rises to the voltage of the power supply 12. Each time the main chopper C is turned OFF, the voltage across the motor armature A and the motor reactor MR falls to zero. The motor armature A responds to the average motor voltage. The average motor current is proportional to the torque of the motor including the armature A. The freewheeling diode FWD allows the motor current to continue due to the inductance of the motor circuit after the chopper C is turned OFF. A power thyristor switch TP is made conductive when it is desired for the motor circuit including the armature A to operate in the power mode for the propulsion of the vehicle coupled with the motor armature A. A power diode DP and a motor field winding F are connected in the power mode circuit including the power thyristor TP, the return conductor 22, the voltage source 12 and the chopper C. A brake thyristor switch TB is made conductive when it is desired for the motor circuit including the armature A to become operative in the brake mode. When dynamic braking operation is desired, one or more of the braking resistors R1, R2, or R3 are included in the brake circuit including the brake diode DB. A well-known commutation circuit 24 is operative to terminate the conduction of the power thyristor switch TP when it is desired for the motor circuit to operate in the brake mode with the brake current flowing through the motor armature A.

The power thyristor switch TP is turned ON in response to the P signal when the motor circuit is desired to operate in the power mode. This causes current to flow through the power diode DP, the motor field F, the motor reactor MR, the motor armature A and the thyristor switch TP from the chopper C to the ground return conductor 22 connected with the power supply 12. The conduction control apparatus 20 is operative with the chopper C to modulate and determine the average current flow in the circuit including the motor armature A. When the chopper C is not conducting the energy stored in the motor reactor MR and the field winding F maintains a current flow in the motor armature A through the freewheeling diode 24.

The brake thyristor switch TB is made conductive in response to the P signal when it is desired that the motor circuit operate in the brake mode for dynamic or regenerative braking of the vehicle coupled with the motor armature A. With the main chopper C turned ON, the brake mode current flows from the generating motor armature A through any of the brake resistors R1, R2 and R3 that are not short circuited to determine the desired level of dynamic braking effort and through the brake diode DB, the chopper C, the motor reactor MR, the motor field F, through the brake thyristor TB and up through the motor armature A. This provides current through the motor field F in the brake mode which remains in the same direction and as determined by the conductivity control of the main chopper C as is the field current in the power mode of operation. When the motor is acting as a generator in the brake mode it produces an output voltage of opposite polarity in relation to the power supply 12. Since the field current remains in the same direction in the power mode and the brake mode, this maintains the same back EMF voltage polarity for the generating motor armature A. The current flow direction through the motor armature A changes in the brake mode as compared to the power mode.

In the brake mode with the chopper C turned OFF the current will flow through a circuit including the power supply 12, the freewheeling diode FWD, the motor reactor MR, the motor field 30, the brake thyristor TB, the motor armature A and any of the resistors R1, R2 and R3 that are not short circuited and through the brake diode DB to regenerate power into the power supply 12.

The vehicle propulsion motor control apparatus as shown in FIG. 3 provides a vehicle coast mode of operation that was not practical with the motor control apparatus shown in FIGS. 1 and 2, where neither one of the power mode and the brake mode of the motor circuit operation is provided. The motor control apparatus as shown in FIGS. 1 and 2 required operation in the power mode to build up enough motor armature current to permit the brake mode of operation to occur with an adequate brake effort buildup and with enough residual field flux to sustain the armature current and the field flux in the motor. With the motor control apparatus as shown in FIG. 3, and in accordance with the more detailed disclosure in above-referenced patent application Serial No. 086,380, when it is desired to operate the vehicle motor control circuit in the brake mode and after a coast mode without previous operation in the power mode, both the power thyristor TP and the brake thyristor TB can be fired to become conducting and the chopper C is used to regulate the current to a desired level through the field winding F and through the two thyristors TB and TP as previously described, and when the brake mode of operation is desired the commutation circuit 24 terminates the conduction of the power thyristor TP and the brake mode of operation begins as previously described. Thusly, after the coast mode of operation, it is not required to go into the power mode before going into the vehicle brake mode of motor operation.

Figure 4:
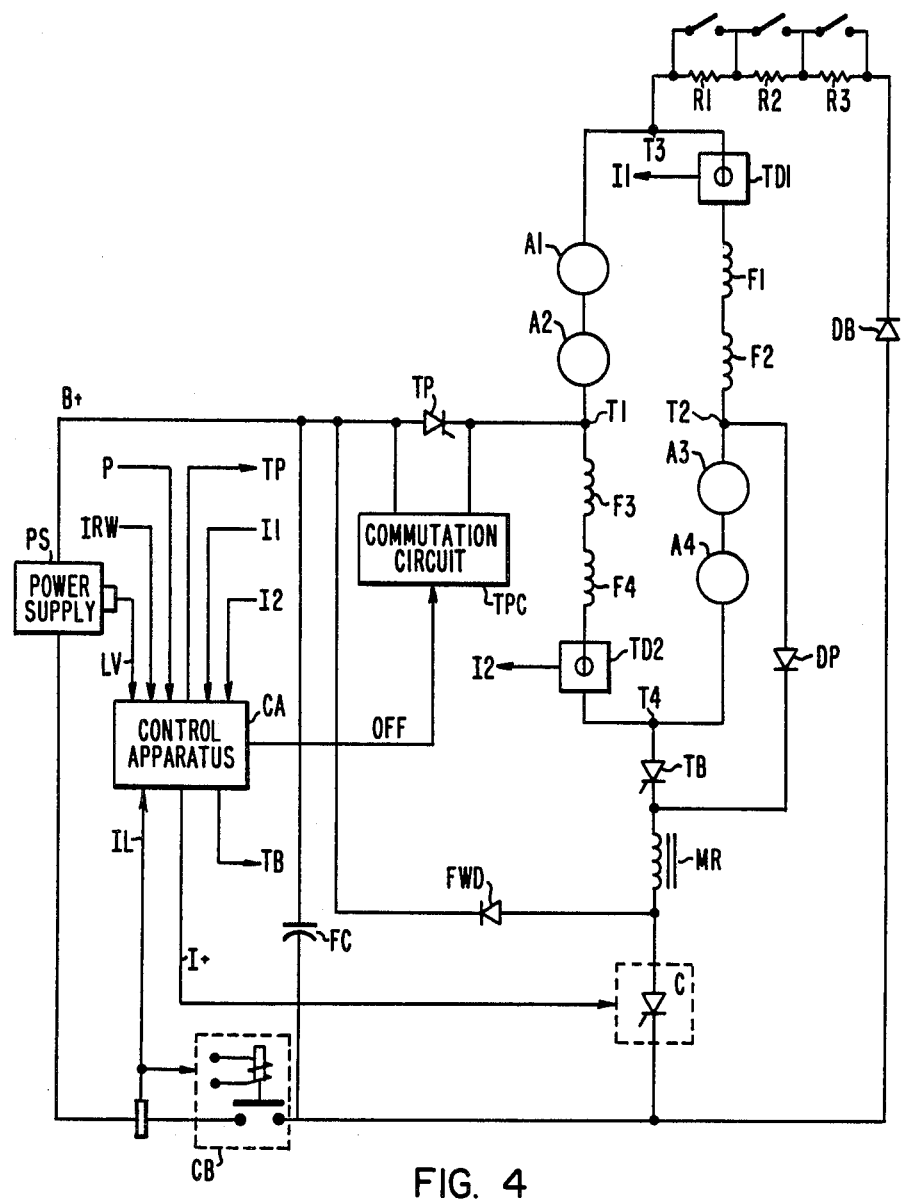
FIG. 4 shows the motor control apparatus of the present invention to determine for a plurality of propulsion motors in one of a power mode and a brake mode of operation.

In FIG. 4 there is illustratively shown the motor control apparatus of the present invention. Four motor armatures A1, A2, A3 and A4 are connected in relation to the associated respective motor fields F1, F2, F3 and F4 in a balanced bridge circuit arrangement. In the power mode of operation the power thyristor TP and the power diode DP are made conducting in relation to a first pair of terminals T1 and T2 to connect the motor armatures A1 and A2 in parallel with the motor armatures A3 and A4, with a first series branch circuit including the fields F1 and F2 with the associated armatures A1 and A2 and with a second series branch circuit including the fields F3 and F4 with the associated armatures A3 and A4. In the brake F4 with the associated armatures A3 and A4. In the brake mode of operation the brake thyristor TB and the brake diode DB are made conducting in relation to a second pair of terminals T3 and T4 to connect the armatures A1 and A2 in parallel with the armatures A3 and A4, with a third series branch circuit including the fields F3 and F4 with the armatures A1 and A2 and with a fourth series branch circuit including the fields F1 and F2 with the armatures A3 and A4. Thusly, both the power mode and the brake mode provides the desired balancing of motor currents and the brake mode provides the desired cross coupling of the motor currents to prevent an overload condition for the operation of any motor.

A Hall effect current sensing transducer TD1 is provided in the branch circuit including the fields F1 and F2 for sensing motor current I1. A Hall effect current sensing transducer TD2 is provided in the branch circuit including the fields F3 and F4 for sensing the motor current I2.

The power thyristor TP is connected to switch the currents in both the fields and the armatures of the first series branch circuit and of the second series branch circuit. The brake thyristor TB is connected to switch the currents in both the fields and the armatures of the third series branch circuit and the fourth series branch circuit.

The current sensing transducer TD2 is provided to sense the current in fields F3 and F4 when both the power thyristor TP and the brake thyristor TB are simultaneously made conducting after a coast operation to energize the fields F3 and F4 in preparation for a brake mode of operation when the power thyristor TP is commutated to begin the brake mode of operation.

The FIG. 4 circuit arrangement selectively provides a power mode connection arrangement with thyristor TP and diode DP conducting to establish a first branch circuit including motor armatures A1 and A2 in series with fields F1 and F2 and a second branch circuit including motor armatures A3 and A4 in series with motor fields F3 and F4. There can be selectively provided a brake mode connection with the thyristor TB and the diode DB conducting to establish a third branch circuit including motor armatures A1 and A2 in series with motor fields F3 and F4 and a fourth branch including motor armatures A3 and A4 in series with motor fields F1 and F2. In addition, there can be selectively provided a transition mode connection arrangement with both the thyristors TP and TB conducting to energize the series-connected fields F3 and F4 in preparation for going from a coast operation into a brake mode of operation as well as in preparation for going from a brake mode operation back into a power mode of operation. The thyristor TP is commutated OFF when it is desired to provide the brake mode of operation after the transition mode has been provided.

A circuit breaker CB is provided to protect against a fault condition ring around current should the main chopper C not commutate for some reason in the power mode and the circuit breaker CB would then operate in response to line current IL becoming larger than a predetermined safe value.

The control apparatus CA can be operative in response to the effort request signal in accordance with the disclosure of the above cross-referenced application Serial No. 902,001 to select one of a power mode and a brake mode. Such a control apparatus could be additionally responsive to line current IL, the line voltage LV, the motor currents I1 and I2 provided by the transducers TD1 and TD2, the load weighed current request IRW. The control apparatus CA provides an output current request signal I+ to the chopper C. In addition, there is provided the ON-control pulse to the power thyristor TP and the OFF-control pulse to the power thyristor commutation circuit TPC. There is provided the ON-control pulse to the brake thyristor TB.

Figure 5:
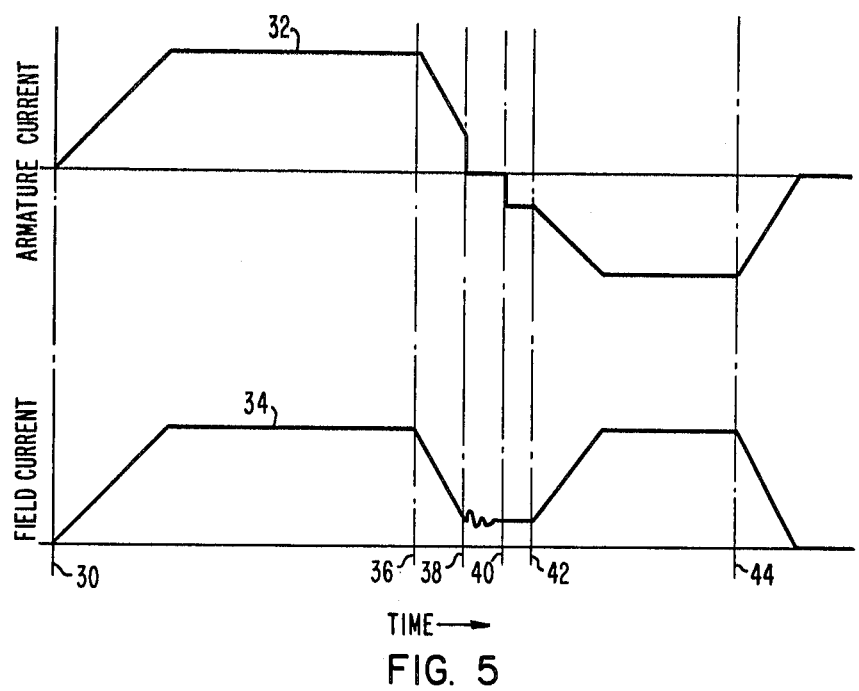
FIG. 5 shows operational current waveforms to illustrate the power and brake modes of the motor control apparatus of FIG. 4.
Figure 6:
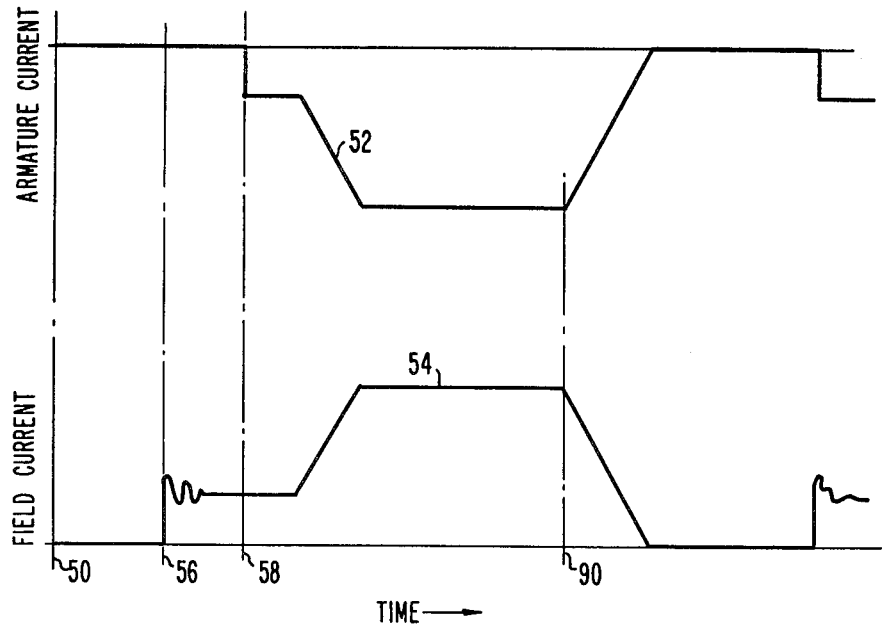
FIG. 6 shows operational current waveforms to illustrate the coast mode of the motor control apparatus of FIG. 4.

In FIGS. 5 and 6, there are shown the operational relationships of the various voltage waveforms to illustrate the operation of the motor control apparatus of the present invention.

In FIG. 5, there are shown current waveforms to illustrate the power mode and brake mode operations of the apparatus shown in FIG. 4 in accordance with the present invention. When the effort request P signal provided to the conduction control apparatus CA has a value above a predetermined level, such as 60 milliamps, the power mode of operation is initiated, with the power thyristor TP being fired to be conductive at time 30. The armature current of the motors is shown by curve 32, and when the power thyristor TP becomes conductive, this armature current normally builds up as determined by the jerk limiter to a regulated desired value as determined by and corresponding to the value of the P signal. The corresponding motor field current is shown by curve 34. At time 36 and when the P signal has a value below a predetermined level, such as 60 milliamps, the brake mode is initiated, and the P signal causes the motor current to drop in accordance with the jerk limiter operation and when a reasonable level of field current is reached after maybe a one second time interval at time 38 the brake thyristor TB is fired to be conductive. The armature current goes to zero as shown by curve 32 when the brake thyristor TB becomes conductive and the field current is regulated at a suitable value by the chopper main thyristor C as shown by curve 34 for a predetermined time period as may be desired, for example 25 milliseconds, between time 38 and time 40. When the field current is stabilized and when desired for the brake mode of operation, at time 40 the power thyristor TP is commutated to be not conductive by the commutation circuit TPC and the armature current now reverses as shown by curve 32. The field current shown by curve 34 and the armature current shown by curve 32 can now be increased, after a predetermined time period such as 25 milliseconds to settle the armature current, by the chopper main thyristor C and in accordance with the jerk limiter to provide the desired amount of brake effort. The time duration from time 38 to time 40 and the time duration from 40 to 42 can be empirically established for the particular motor circuit of a given vehicle, with the above value of 25 milliseconds being for purposes of example. At time 44 when brake effort is no longer desired, if the chopper main thyristor C stops conducting the respective armature and field currents will fall to zero as shown by the curves 32 and 34. If desired a return to power mode operation as previously described can then be made.

In FIG. 6, there are shown current waveforms to illustrate the coast mode operation of the apparatus shown in FIG. 4. Assuming the vehicle is moving along a roadway track at time 50 after a previous power mode of operation and with the chopper main thyristor C not conducting, the armature current as shown by curve 52 and the field current as shown by curve 54 are both zero. To initiate the brake mode of operation at time 56, both the power thyristor TP and the brake thyristor TB are fired to be conductive and the field current builds up to a value as regulated by the main thyristor C. When the field current has stabilized, at time 58 the power thyristor TP is commutated and the armature current as shown by curve 52 goes to a controlled reverse value corresponding with the field current shown by curve 54 and as determined by the chopper main thyristor C controlling these current values in the brake mode of operation. When the brake mode is no longer desired by the P signal, the main thyristor C stops conducting and the armature current goes to zero as does the field current.

It is readily apparent and known by persons skilled in this art how to provide the required firing and commutation control signals from the conduction control apparatus CA to effect each of the power mode, brake mode and coast mode operations as illustrated in FIGS. 5 and 6.

We claim:

1. In control apparatus for a plurality of direct current motors operative with a voltage source and an effort request signal for determining one of a power mode of operation and a brake mode of operation for said motors, with each of said motors having an armature and a field, the combination of:

circuit means having first and second terminals and a first circuit including the armature and field of a first motor and a second circuit including the armature and the field of a second motor connected between said first and second terminals, said circuit means having third and fourth terminals and a third circuit including the first motor armature and the second motor field and a fourth circuit including the first motor field and the second motor armature connected between said third and fourth terminals, first switch means connected with said voltage source and controlling the current through said first and second circuits to establish said power mode, and second switch means connected to control the current through said third and fourth circuits to establish the brake mode, with the first switch means including a power diode connected to be conductive in a first direction and provided to conduct power mode current through the first and second motor armatures in said first direction, and with the second switch means including a brake diode connected to be conductive in a second direction and provided to conduct brake mode current through the first and second motor armatures in said second direction.

2. The control apparatus of claim 1, including control means responsive to said effort request signal and coupled to make the first switch means conductive through the power diode to determine said power mode of operation and coupled to make the second switch means conductive through the brake diode to determine said brake mode of operation.

3. The apparatus of claim 1,
with said circuit means providing a first bridge arrangement between the first and second terminals and including the first and second circuits connected in parallel and providing a second bridge arrangement between the third and fourth terminals and including the third and fourth circuits connected in parallel.

4. The control apparatus of claim 1, with said control means being coupled to make each of the first and the second switch means conductive to energize at least one of the motor fields connected between the first and fourth terminals in preparation for going to the brake mode of operation.

5. The control apparatus of claim 1, including current sensing means operative with said control means and connected between the first and fourth terminals for sensing the current flow through the field of one of said first and second motors.

* * * * *